US007987943B2

(12) United States Patent
Wei et al.

(10) Patent No.: US 7,987,943 B2
(45) Date of Patent: **\*Aug. 2, 2011**

(54) APPARATUS AND METHOD FOR GENERATING A SEISMIC SOURCE SIGNAL

(75) Inventors: Zhouhong Wei, Stafford, TX (US); John Crowell, Friendswood, TX (US); James Teske, Santa Fe, TX (US)

(73) Assignee: Inova Ltd., George Town, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 12/623,752

(22) Filed: Nov. 23, 2009

(65) Prior Publication Data

US 2010/0071989 A1  Mar. 25, 2010

Related U.S. Application Data

(63) Continuation of application No. 11/691,941, filed on Mar. 27, 2007, now Pat. No. 7,628,248.

(60) Provisional application No. 60/825,285, filed on Sep. 12, 2006, provisional application No. 60/786,224, filed on Mar. 27, 2006.

(51) Int. Cl.
*G01V 1/40* (2006.01)
*G01V 1/02* (2006.01)
*G01V 1/04* (2006.01)
*G01V 1/28* (2006.01)
*G01V 1/155* (2006.01)

(52) U.S. Cl. ........ 181/106; 181/113; 181/114; 181/119; 181/121; 367/189; 367/190; 702/17

(58) Field of Classification Search .................. 181/106, 181/113, 114, 119, 121; 367/189, 190; 702/17
See application file for complete search history.

(56) References Cited

U.S. PATENT DOCUMENTS

| 3,439,773 | A | * | 4/1969 | Dart et al. ...................... 181/117 |
| 3,929,206 | A | * | 12/1975 | Bedenbender et al. ....... 181/114 |
| 4,049,077 | A | * | 9/1977 | Mifsud .......................... 181/114 |
| 4,143,736 | A | * | 3/1979 | Fair ............................... 181/114 |
| 4,147,228 | A | * | 4/1979 | Bouyoucos ................... 181/119 |
| 4,336,745 | A | * | 6/1982 | Lund ................................. 91/35 |
| 4,442,755 | A | * | 4/1984 | Rozycki ............................ 91/39 |
| 4,492,285 | A | * | 1/1985 | Fair et al. ...................... 181/114 |

(Continued)

OTHER PUBLICATIONS

Alleyne, Andrew et al. "Nonlinear Adaptive Control of Active Suspensions," IEEE Transactions on COntrol Systems Technology, Mar. 1995, vol. 3, No. 1; pp. 94-101.

(Continued)

*Primary Examiner* — Elvin G Enad
*Assistant Examiner* — Christina Russell
(74) *Attorney, Agent, or Firm* — Wong, Cabello, Lutsch, Rutherford & Brucculeri, LLP

(57) ABSTRACT

A seismic source signal generator includes a mass, a primary accumulator and a secondary accumulator, the secondary accumulator having an internal volume smaller than an internal volume of the primary accumulator. A method for generating a signal using a seismic vibrator includes operating the seismic vibrator using hydraulic fluid, damping hydraulic pressure deviations in the hydraulic fluid using a first accumulator in hydraulic communication with the hydraulic fluid, and damping pressure deviations in the hydraulic fluid using a second accumulator in hydraulic communication with the hydraulic fluid, the second accumulator having an internal volume smaller than an internal volume of the first accumulator.

32 Claims, 7 Drawing Sheets

U.S. PATENT DOCUMENTS

| | | | | |
|---|---|---|---|---|
| 4,519,053 | A * | 5/1985 | Bedenbender | 367/190 |
| 4,637,002 | A * | 1/1987 | Sallas | 367/190 |
| 4,658,930 | A * | 4/1987 | Bird | 181/113 |
| 4,699,240 | A * | 10/1987 | Dedole | 181/113 |
| 4,718,049 | A * | 1/1988 | Crowell et al. | 367/189 |
| 5,018,598 | A * | 5/1991 | Sodich | 181/106 |
| 5,113,966 | A * | 5/1992 | Gregory et al. | 181/106 |
| 5,128,908 | A * | 7/1992 | Reust | 367/190 |
| 5,137,109 | A * | 8/1992 | Dorel | 181/106 |
| 5,401,919 | A * | 3/1995 | Crowell et al. | 181/121 |
| 5,491,306 | A * | 2/1996 | Gram | 181/106 |
| 5,666,328 | A * | 9/1997 | Crowell et al. | 367/189 |
| 6,065,562 | A * | 5/2000 | Bird et al. | 181/113 |
| 6,152,256 | A * | 11/2000 | Favret et al. | 181/111 |
| 6,253,549 | B1 * | 7/2001 | Ambs | 60/371 |
| 6,338,394 | B1 * | 1/2002 | Meynier | 181/113 |
| 6,552,961 | B1 * | 4/2003 | Bremner et al. | 367/23 |
| 7,628,248 | B2 * | 12/2009 | Wei et al. | 181/106 |
| 2005/0252711 | A1 * | 11/2005 | Rau | 181/121 |
| 2007/0240930 | A1 * | 10/2007 | Wei et al. | 181/121 |

OTHER PUBLICATIONS

Garagic, Denis et al., "Application of Nonlinear Adaptive Control Techniques to an Electrohydraulic Velocity Servomechanism," IEEE Transactions on Control Systems Technology, Mar. 2004, vol. 12, No. 2; pp. 303-314.

Liu, Rui, "Nonlinear Control of Electro-hydraulic Servosystems: Theory and Experiment," Tsinghua University, 1994; pp. 1-122, Urbana, Illinois, USA.

Rajamani, Rajesh et al., "Adaptive Observers for Active Automotive Suspensions: Theory and Experiment," IEEE Transactions on Control Systems Technology, Mar. 1995, vol. 3, No. 1; pp. 86-93.

Sohl, Garett A. et al., "Experiments and Simulations on the Nonlinear Control of a Hydraulic Servosystem," IIEE Transactions on Control Systems Technology, Mar. 1999 vol. 7, No. 2; pp. 238-247.

International Search Report in PCT/US07/07523, dated Aug. 22, 2008.

Int'l. Preliminary Report on Patentability and Written Opinion in PCT/US07/07523, dated Aug. 22, 2008.

* cited by examiner

APPARATUS AND METHOD FOR GENERATING A SEISMIC SOURCE SIGNAL

CROSS-REFERENCE TO RELATED APPLICATIONS

This is a continuation of U.S. application Ser. No. 11/691,941, which is incorporated herein by reference in its entirety, to which priority is claimed, and which claims the benefit of U.S. Provisional Application Ser. No. 60/825,285 filed on Sep. 12, 2006 and titled "Apparatus and Method for Generating a Seismic Source Signal" and of U.S. Provisional Application Ser. No. 60/786,224 filed on Mar. 27, 2006 and titled "Apparatus and Method for Generating a Seismic Source Signal," the entire disclosures of which are hereby incorporated herein by reference.

BACKGROUND

1. Technical Field

The present disclosure generally relates to seismic prospecting and in particular to methods and apparatus for generating seismic source signals with reduced signal distortions.

2. Background Information

In the oil and gas exploration industry, geophysical tools and techniques are commonly employed in order to identify a subterranean structure having potential hydrocarbon deposits. Many different techniques are used to generate a seismic signal.

Seismic vibratory energy sources have been used in the field many years. A seismic vibrator in its simplest form is merely a heavy vehicle that has the ability to shake the ground at a predetermined range of frequencies of about 2 to 250 Hz. The vibrator imparts a signal into the subsurface of the earth over a relatively long period of time, which allows for an energy level less than impulse generators such as dynamite.

The imparted energy, known as the seismic source signal or "pilot" signal, travels through the subsurface and reflects some of the energy from certain subsurface geological boundaries or layers. The reflected energy is then transmitted back to the earth's surface where it is recorded using an earth motion detector. The recorded data is processed to yield information about a location and physical properties of layers making up the subsurface.

The seismic vibrator source signal is typically a sweep signal, or simply sweep. Sweeps are sinusoidal vibrations in the 2-250 Hz range described above and may have a duration on the order of 2 to 20 seconds depending on the terrain, the subsurface lithology, economic constraints and physical capabilities of the vibrator. The sinusoidal sweep can be increased in frequency overtime, which is called an "upsweep." The upsweep is the signal used typically in modern seismic exploration. Also, the sinusoidal sweep can be decreased in frequency overtime, which is called a "downsweep." The end products of the vibrator sweep are waves that propagate through the earth to return clues about the subsurface.

A problem with the typical sweep is that the signal imparted into the earth includes distortions caused by harmonic signals generated by one or more of the seismic source components, e.g. the hydraulic, mechanical and electromechanical subsystems making up the source.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

Disclosed is a seismic vibrator including a mass and a servo valve coupled to the mass for controlling hydraulic fluid. A first accumulator is in hydraulic communication with the hydraulic fluid, and a second accumulator is in hydraulic communication with the hydraulic fluid, the second accumulator having an internal volume smaller than an internal volume of the first accumulator.

In another aspect, a seismic vibrator includes a mass, a first accumulator, and a second accumulator, at least one of the first accumulator and the second accumulator being disposed on the mass.

A method for generating a signal using a seismic vibrator is disclosed. The method includes coupling a seismic vibrator to the earth, operating the seismic vibrator using hydraulic fluid, damping hydraulic pressure deviations in the hydraulic fluid using a first accumulator in hydraulic communication with the hydraulic fluid, and damping pressure deviations in the hydraulic fluid using a second accumulator in hydraulic communication with the hydraulic fluid, the second accumulator having an internal volume smaller than an internal volume of the first accumulator.

BRIEF DESCRIPTION OF THE DRAWINGS

For a detailed understanding of the present disclosure, reference should be made to the following detailed description of the several non-limiting embodiments, taken in conjunction with the accompanying drawings, in which like elements have been given like numerals and wherein.

DESCRIPTION OF EXEMPLARY EMBODIMENTS

Figure 1:
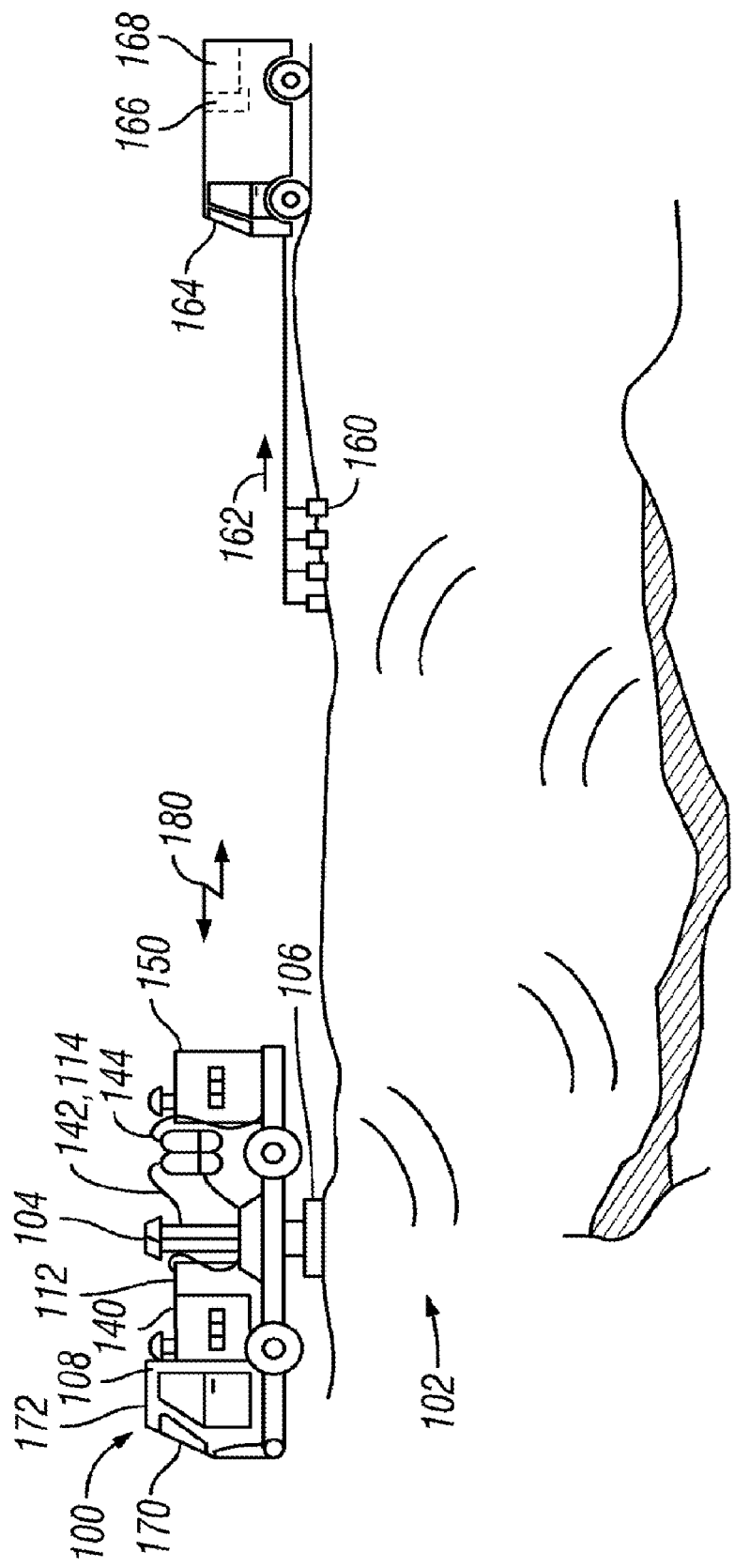
FIG. 1 illustrates a non-limiting example of a seismic data acquisition operation.

FIG. 1 depicts a geophysical survey layout incorporating several aspects of the present disclosure. A vibratory seismic source signal generator 100 is positioned at a predetermined location in an area of exploration and coupled to the earth. In the embodiment shown the vibratory seismic source signal generator 100 is a truck-carried vibratory seismic source. For the purposes of this disclosure, vibratory seismic source signal generator is referred to more simply as signal generator. The signal generator 100 may be a single axis signal generator imparting, for example, only compression P-waves into the earth. Those skilled in the art would recognize that a multi-axis signal generator is capable of imparting both P and S waves into the earth and may be configured according to the present disclosure described in detail herein below without additional illustration or description. Therefore, the present disclosure will focus on a single axis vibratory seismic source signal generator for brevity and without limiting the scope of the disclosure.

The signal generator 100 includes a truck 170 having a cab 172 housing a controller 108. The signal generator 100 includes a hydraulic subsystem 140 used to move a reaction mass 104. As will be described in more detail in reference to FIG. 2, the moving reaction mass 104 acts upon a base plate 106 to impart a seismic source signal 102 into with the earth. The signal 102 travels through the earth, reflects at discontinuities and formations and travels toward the earth's surface.

A plurality of sensors 160 are coupled to the earth in an array spaced apart from the signal generator 100. The sensors 160 detect the reflected source signal 102, and electrical signals 162, which may be digital and/or analog, are transmitted from the array of sensors 160 to a recording station 166 typically housed in a truck 164. The recording station 166 includes a seismic recorder 168 and may also include a correlation processor, which also receives an electrical signal 180 indicative of the actual source signal 102 imparted into the earth.

Still referring to FIG. 1, the signal generator 100 comprises several subsystems having system components used in generating the seismic signal 102. The signal generator 100 includes a hydraulic pump subsystem 140 having hydraulic lines 142 carrying hydraulic fluid 114 to a servo valve assembly 112. A cooler 150 is typically present to cool the hydraulic subsystem. Low frequency accumulators 144 mounted on the truck are relatively large, e.g. about five to ten gallons (19 to 39 liters) or more, and serve to dampen low frequency noise, e.g. about 25 Hz or less, caused by operation of the hydraulic system.

Figure 2:
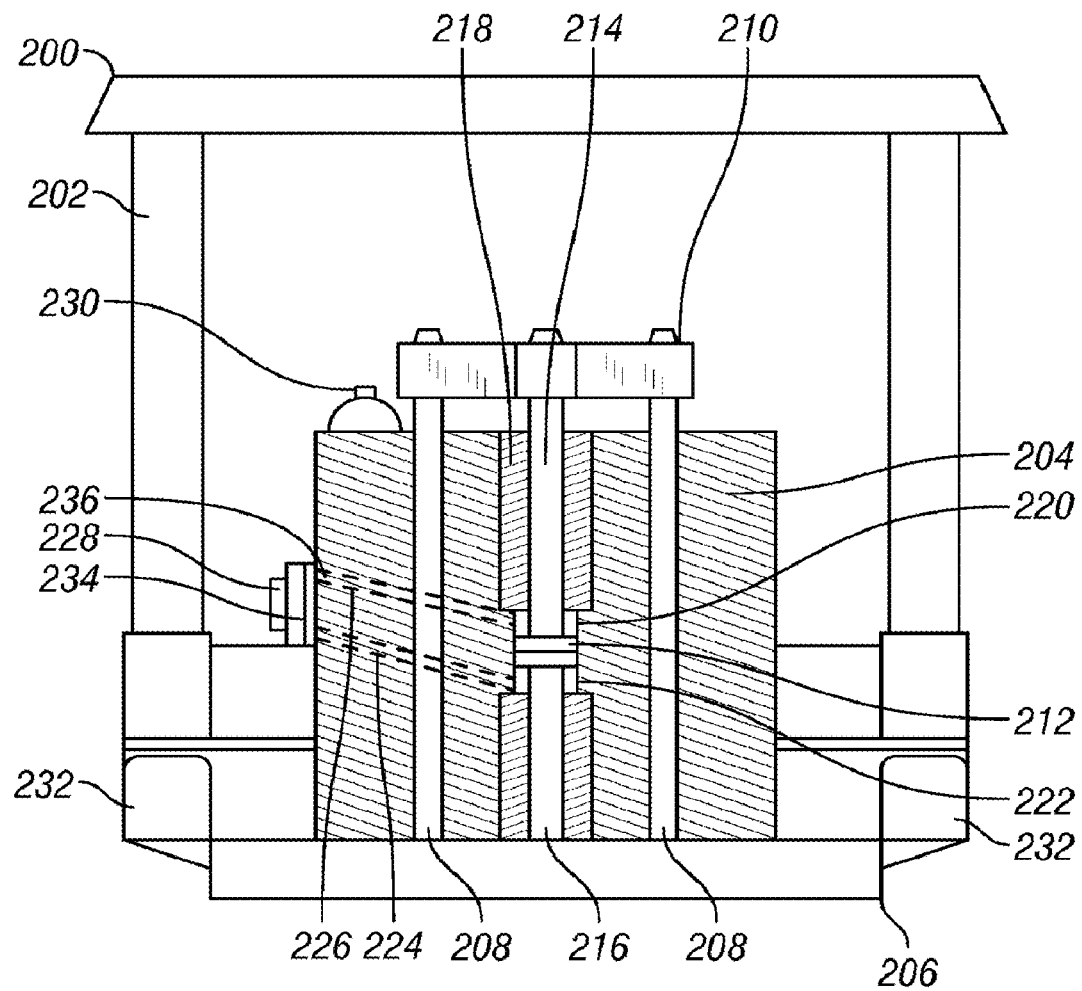
FIG. 2 is an elevation view in cross section of a non-limiting example of a vibratory seismic source signal generator.

FIG. 2 is an elevation view in cross section of a vibratory seismic source signal generator 200 similar to the signal generator 100 described above and shown in FIG. 1. The signal generator 200 may be carried on a vehicle such as the truck 170 described above and shown in FIG. 1. The signal generator 200 includes a lift mechanism assembly 202, a moveable mass 204 and a base plate 206. The mass 204 and base plate 206 may each be constructed substantially from a metal such as steel or iron. Those skilled in the art are versed in the general materials of construction, so a detailed materials list is not necessary here. The lift mechanism assembly 202 may be hydraulic, mechanical, electromechanical or any mechanism assembly useful for lowering and raising the base plate 206 to engage and disengage the ground.

A stilt structure 208 extends from the base plate 206 through the mass 204. A cross piece 210, which may be constructed from steel or iron I-beam, is coupled to a top section of the stilt structure 208 to provide stability to the stilt structure as the mass 204 vibrates. The stilt structure 208 may be constructed using tubular pipes made of a metal such as steel or iron, although other shapes and materials of construction may be used without departing from the scope of the present disclosure.

A piston 212 includes opposing piston rods 214, 216 extending through the mass 204. The upper rod 214 being coupled to a hub in the cross piece 210 and the lower rod may be coupled to a hub in the base plate 206. The piston 212 is slidably received in a cylinder 218 extending vertically through the mass 204. Upper and lower annular chambers 220, 222 are located immediately above and below the piston 212 and around the upper and lower piston rods 214, 216. Hydraulic fluid passages 224, 226 lead from respective chambers 220, 222 to a servo-valve assembly 228 mounted on an exterior surface of the mass 204. Alternatively, a ported spacer 234 may be mounted between the mass 204 and servo-valve assembly 228. Supply and return hydraulic lines (FIG. 1 at 142) couple the servo-valve assembly 228 and one or more small accumulators 230, which are mounted on the mass 204 close to the servo-valve assembly 228, to a hydraulic pump subsystem 140 described above and shown in FIG. 1. A pair of high frequency accumulators 230 are mounted as close as practicable to the servo-valve assembly has been found to aid in seismic source signal noise reduction. High frequency accumulators 230 may be relatively small. In one non-limiting example, the accumulators may be about five gallons or less, and serve to dampen high frequency noise, e.g. about 25 Hz or more, caused by operation of the servo-valve assembly 228.

In one non-limiting embodiment, pressure sensors 236 may be used to measure supply hydraulic pressure, return hydraulic pressure, and hydraulic pressure to/from hydraulic passageways 224, 226 for use at least in part for control algorithms and methods according to the disclosure.

Hydraulic fluid 114 pumped to and from the cylinder chambers 220, 222 causes the mass 204 to reciprocally vibrate in a vertical direction. The force generated by the vibrating mass is transferred to the base plate 206 via the stilt structure 208 and lower piston rod 216. The vibration force may be isolated from the vehicle by use of isolators 232 known in the art. The number and position of isolators may be determined in part by the shape of the base plate.

Figure 3:
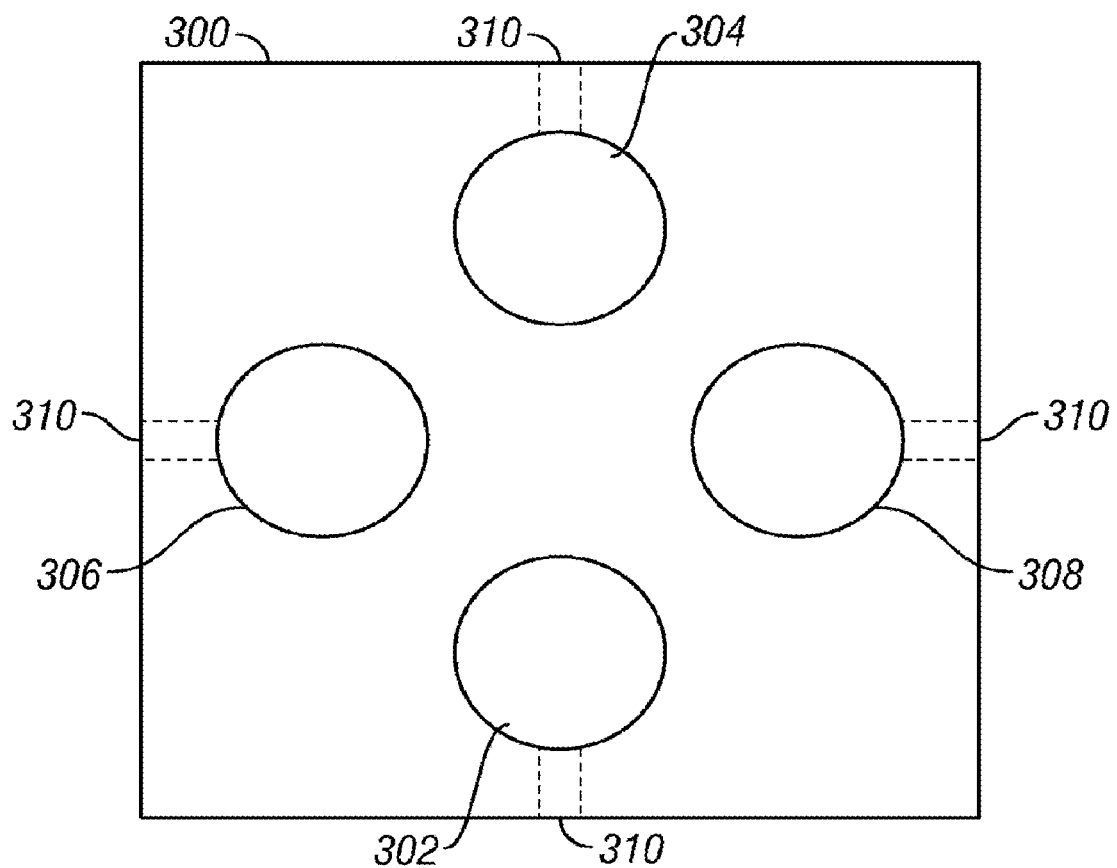
FIG. 3 is a top view of a non-limiting example of a ported spacer.

FIG. 3 is a top view of a non-limiting example of ported spacer 300. A servo-valve actuator such as servo valve 228 may be mounted to align ports of the servo-valve to corresponding ports on the spacer 300. The spacer 300 includes a hydraulic fluid supply port 302, a hydraulic fluid system return port 304, and two hydraulic fluid mass control ports 306, 308. Passageways 310 provide fluidic coupling for pressure sensors 236, which are not separately shown in this figure. The pressure sensors 236 are used to measure supply and control pressures, which measurements are then used at least in part in methods according to the present disclosure. The sensors 236 measure pressure high-side supply pressure $P_H$ at the supply port 302, supply return pressure $P_R$ at the system return port 304, mass control pressure $P_A$ to upper chamber 220, and mass control pressure $P_B$ to lower chamber 222. The ported spacer 300 may be made of any material compatible with pressurized hydraulic fluid and with the materials comprising the mass surface and the servo-valve used. Typically a metal such as steel or iron may be used to manufacture the ported spacer by machining or by casting. A servo-valve 228 may be manufactured or modified to include passageways 310 and the pressure sensors 236 making the ported spacer an optional feature. Using a ported spacer allows for the use of a commercial off-the-shelf servo-valve without the need for special manufacturing or modification. Configurations with and/or without a ported spacer, are considered within the scope of the present disclosure.

Figure 4:
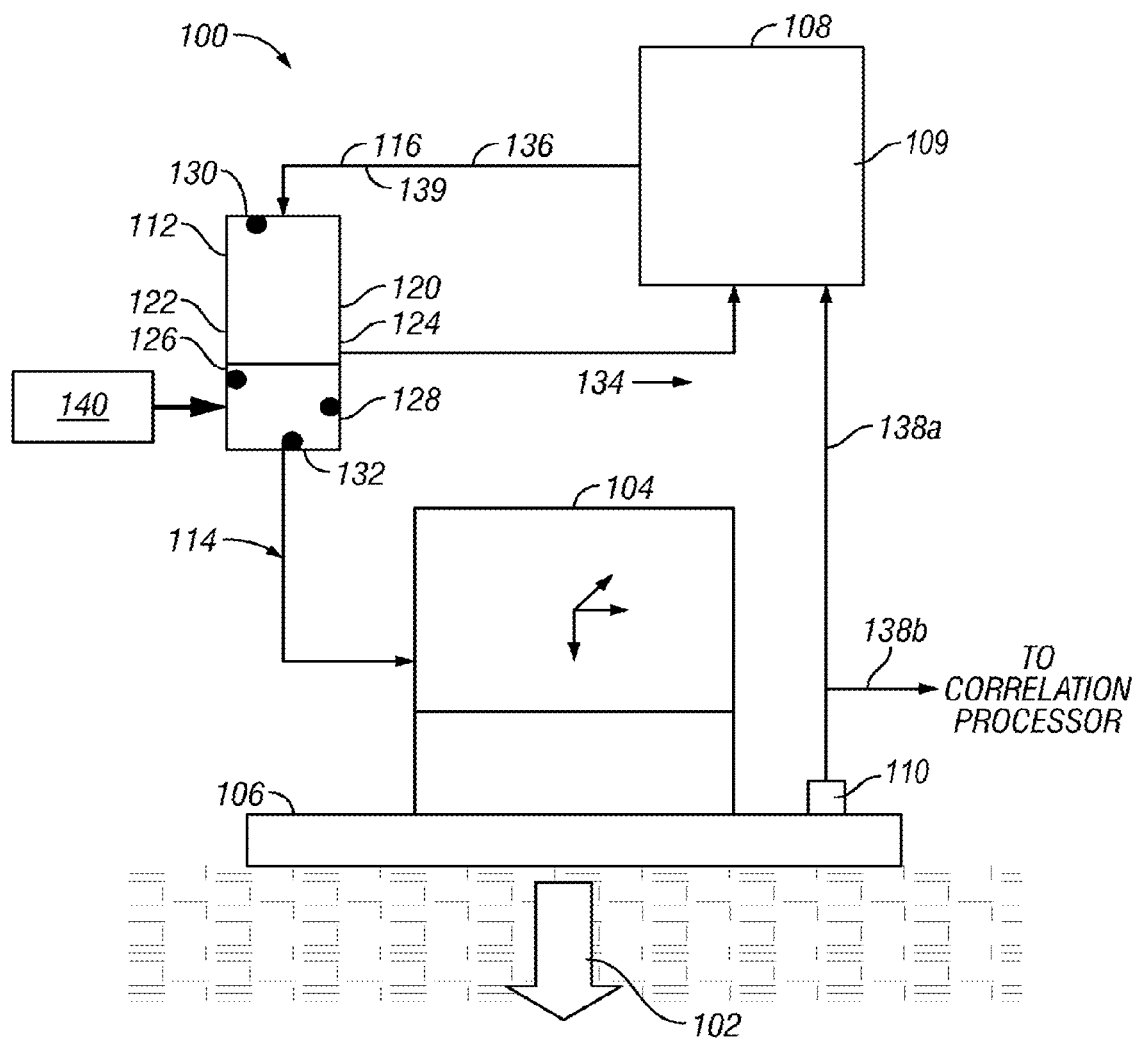
FIG. 4 is a non-limiting schematic representation of functional features of a vibratory seismic source signal generator.

FIG. 4 schematically illustrates a signal generator 100 substantially as described above and shown in FIGS. 1 and 2, useful for imparting a sinusoidal seismic signal 102 into the earth. Reference numerals are aligned with the like components of FIG. 1, but the schematically-illustrated components of FIG. 4 are also applicable to similar elements shown on FIG. 2 having different reference numerals, which are provided parenthetically below for clarity. The base plate 106 (206) is coupled via static weight to the earth. The reaction mass 104 (204) is movably coupled to the base plate 106 (206) such that controlled movement of the reaction mass 104 (204) via the hydraulic subsystem 140 vibrates the base plate 106 (206) at a desired amplitude and frequency or sweep to generate the signal 102. The controller 108 includes a processor 109 for controlling the system 100. The controller is electrically coupled to the servo valve assembly 112 (228). The servo valve assembly 112 (228) includes a servo motor 120, a pilot valve 122 and a main stage valve 124.

The servo valve assembly 112 (228) controls fluid movement in the hydraulic subsystem 140, which provides a force for moving the reaction mass 104 (204). An electrical signal 116 having characteristics of the desired sweep signal is transmitted from the controller 108 to the servo motor, which operates the pilot valve 122. The pilot valve 122 is coupled to the main stage valve 124 and includes a hydraulic coupling for transferring hydraulic pressure to operate the main stage valve. When operated, the main stage valve pressurizes and depressurizes hydraulic passages 226, 224 to move the reaction mass 104 (204) according to the controller signal. High frequency accumulators 230 may be used to dampen pressure variations in the high-side (supply pressure) hydraulic loop and in the low-side (return pressure) hydraulic loop, which helps to reduce or remove distortion from the source signal.

As noted in the background of the disclosure, a problem associated with the typical source generator is distortions of the generated signals, which distortions are caused by characteristics of components comprising the system, e.g., the servo valve assembly 112. The servo valve assembly 112 (228) may exhibit characteristics during operation, which generate harmonic distortions in the acoustic signal imparted to the earth. These distortions affect the output of the source and thus many or all signals received by seismic sensors 160 are degraded.

In several non-limiting embodiments, the seismic signal 102 is created by regulating the flow of the pressurized hydraulic fluid 114 against the reaction mass 104, forcing the reaction mass 104 (204) to reciprocate vertically rapidly and repeatedly. Acoustic characteristics of this vibration are controlled by regulating the flow of the hydraulic fluid 114 to adjust the speed and force of the reaction mass 104.

Force and phase control may be used to reduce acoustic noise. Force and phase control may be achieved by mounting accelerometers 110 on the reaction mass 104 (204) and the base plate 106 (206) to estimate their respective motions. Once the reaction mass 104 (204) and the base plate 106 (206) are set in motion, the accelerometers 110 transmit motion estimates via signals 138a, 138b to the controller 108 and/or to the correlation processor 166. When sent to the controller 108, these motion estimates 138a serve as feedback for a force and phase control algorithm processed by the processor 109 to modify the control signal using a force and phase control signal 136. The control signal 116 modified by the force and phase control signal 136 is then transmitted to the servo-valve assembly 112 (228) for controlling the servo motor 120 to regulate flow of the hydraulic fluid 114 against the reaction mass 104 (204) and, thereby, control the phase and frequency of the seismic signal 102.

The control signal 116 provides the principal control input to the servo valve assembly 112, aspects of the disclosure include further control adjustments made using input signals from process sensors 126, 128, 130, 132. Several embodiments of the disclosure may include one or more sensors measuring hydraulic fluid supply pressure $P_S$, which comprise a high-side pressure sensor $P_H$ 126, and a hydraulic fluid discharge or return pressure sensor $P_R$ 128. Pressure sensors are collectively numbered 236 in FIG. 2. A torque motor current sensor 130 and a main stage valve position indicator 132 may also be used as process sensors. The $P_S$ sensor 126 estimates the pressure of hydraulic fluid 114 supplied to the servo-valve assembly 112 (228) and the $P_R$ sensor 128 estimates hydraulic pressure discharged from the servo valve assembly 112. Electrical signals 134 from any or all of the process sensors 126, 128, 130, 132 is/are transmitted to the controller 108 and processed during operation using the processor 109. A process control signal 139 is then used as a feed-forward signal to the servo valve assembly 112. In this manner, harmonic distortions generated by the seismic source components, e.g. components making up the mechanical, hydraulic and electromechanical components of the servo valve assembly 112, can be removed partially or completely from the seismic source signal 102 prior to the reaction mass movement generating the signal 102.

Figure 5:
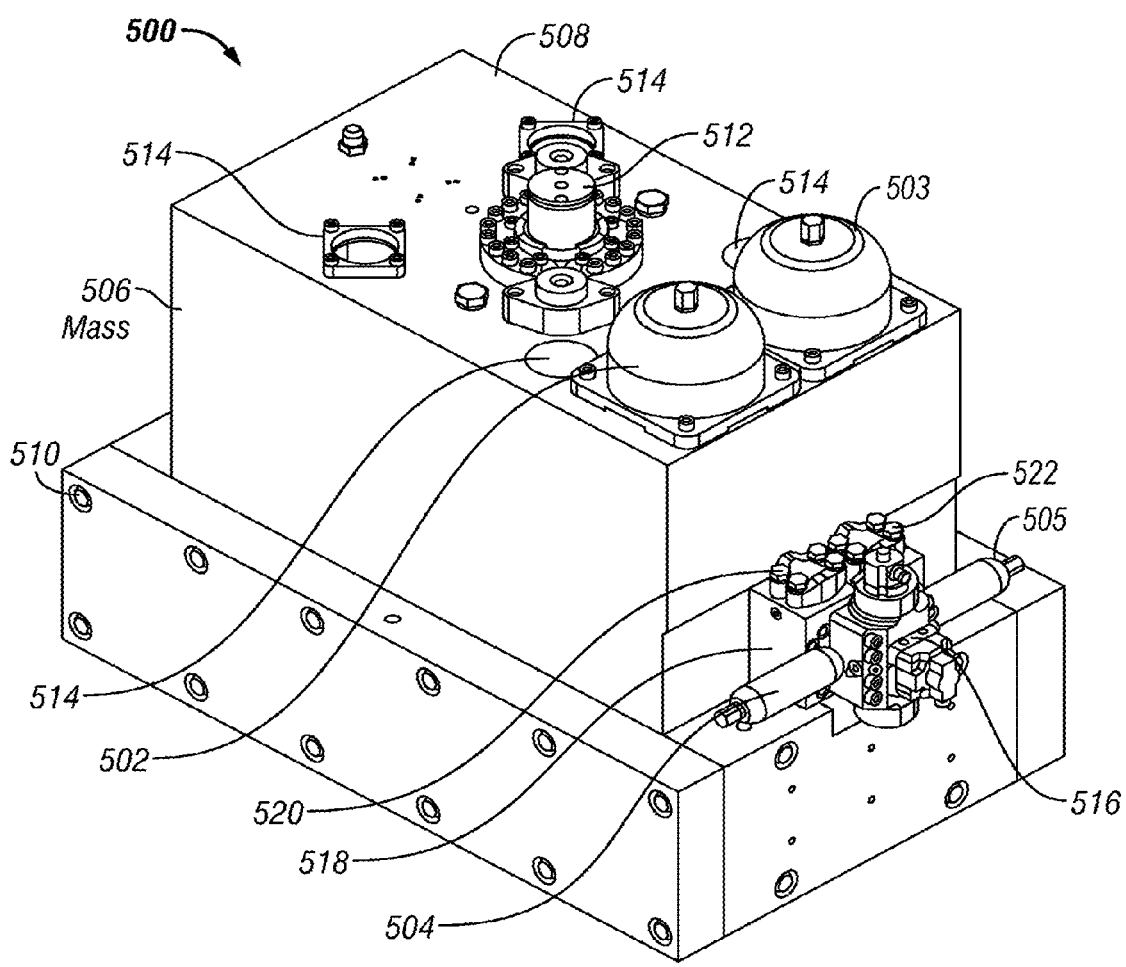
FIG. 5 is a non-limiting example of a vibratory seismic source signal generator.

FIG. 5 illustrates a non-limiting example of a vibratory seismic source signal generator 500 including primary accumulators 502, 503 and secondary accumulators 504, 505. In one non-limiting embodiment, the signal generator 500 may include a mass 506, a piston structure and a stilt structure as described above and shown in FIG. 2.

In one non-limiting embodiment, the signal generator 500 may include a mass 506 having a mass upper portion 508 coupled to a mass lower portion 510. The mass upper portion 508 may include a horizontal cross section smaller than a horizontal cross section of the mass lower portion 510 to provide a lower center of gravity or center of mass for the signal generator 500.

As shown in FIG. 5, the signal generator 500 may include a piston 512 extending through the mass 506. A stilt structure (not shown in this view) may be similar to the stilt structure 208 described above and shown in FIG. 2. The stilt structure 208 may be received through the mass 506 via an appropriate number of stilt structure receiving conduits 514 extending through the mass 506.

A pilot servo valve 516, in one non-limiting embodiment, may be coupled to the mass 506. Where the mass 506 includes an upper portion 508 and a lower portion 510, the valve 516 may be coupled to either the lower portion or to the upper portion. FIG. 5 illustrates one non-limiting embodiment where the valve 516 is coupled to the mass 506 at an upper portion. The valve 516 may be coupled directly to the mass 506 or to the mass 506 via a spacer or a manifold 518. In one non-limiting embodiment, the manifold 518 includes a low pressure hose port 520 and a high pressure hose port 522. The low pressure hose port 520 and the high pressure hose port 522 receive respective hydraulic hoses (not shown) used for operating the signal generator 500. The high pressure hose port 522 and the low pressure hose port 520 are each in fluidic communication with the servo valve 516.

In the non-limiting example of FIG. 5, the primary accumulators 502, 503 are positioned on the source 500. In one embodiment, the primary accumulators 502, 503 may be coupled to the source mass 506. In one embodiment, the primary accumulators 502, 503 may be positioned apart from the mass and positioned on a carrier such truck 170 described above and shown in FIG. 1. The primary accumulators 502, 503 may be of any hydraulic accumulator type, such as piston or bladder, suitable for hydraulic systems. In one non-limiting embodiment, the primary accumulators are bladder type accumulators.

The primary accumulators 502, 503 may include any suitable internal volume capable of reducing pressure variations in the associated hydraulic fluid loop. In one non-limiting example, the primary accumulators 502, 503 include internal volumes of about two and one-half gallons (9.5 liters) each to about five gallons (19 liters) each.

Continuing with the non-limiting example of FIG. 5, the signal generator 500 may include secondary accumulators 504, 505. One secondary accumulator 505 is coupled to a high pressure hydraulic loop, and one secondary accumulator 504 is coupled to a low pressure hydraulic loop. In one embodiment, the secondary accumulators have internal volumes smaller than the respective internal volumes of the primary accumulators 502, 503. In one non-limiting embodiment, the secondary accumulators each include an internal volume of about one-half or less of the corresponding primary accumulator volume. In one non-limiting example, the secondary accumulators each have an internal volume of about ten cubic inches (0.16 liters). The secondary accumulators 505, 505 may be of any hydraulic accumulator type, such as piston or bladder, suitable for hydraulic systems. In one non-limiting embodiment, the secondary accumulators 504, 505 are bladder type accumulators.

Figure 6:
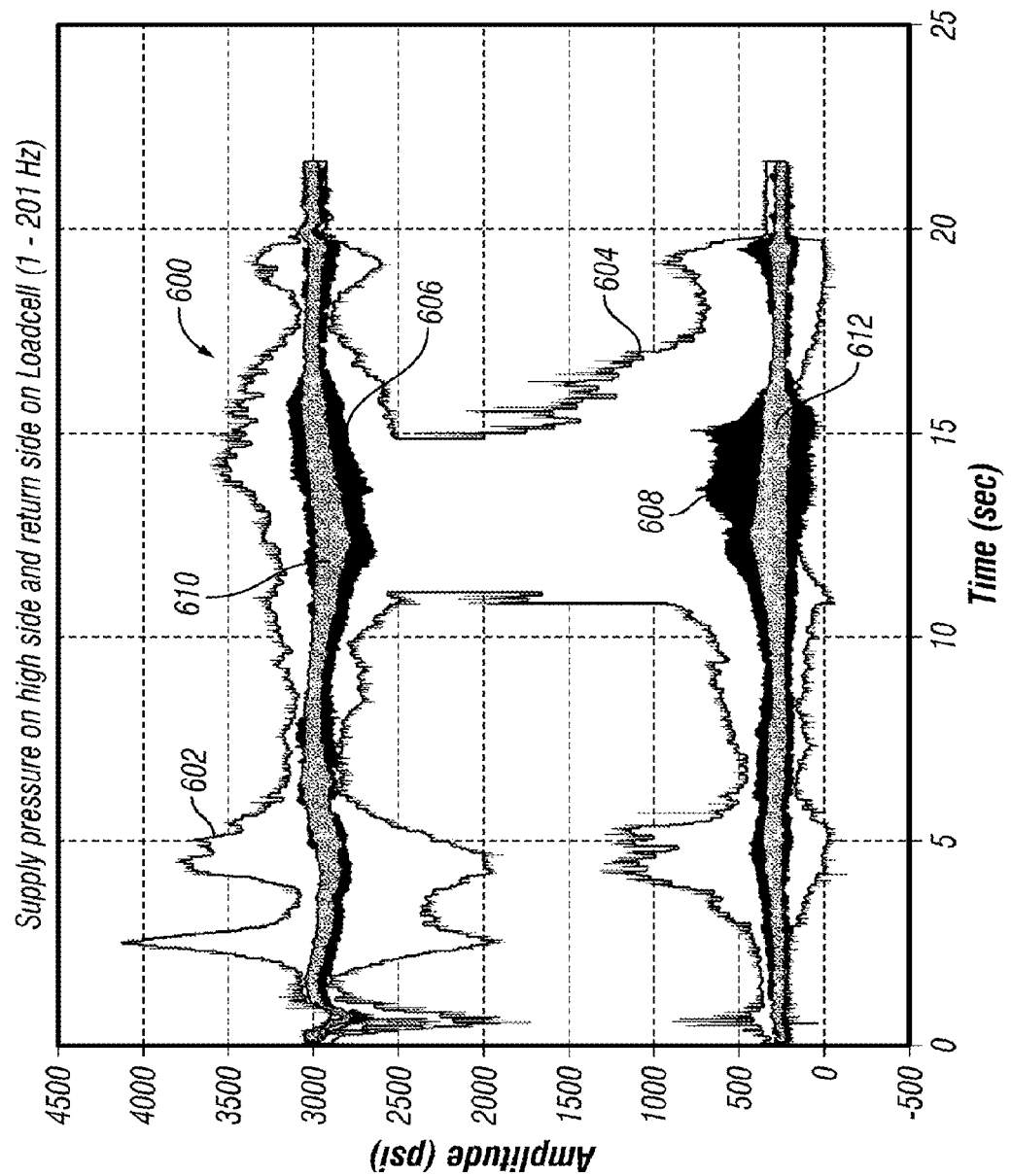
FIG. 6 shows a non-limiting example or a time-dependent plot of high-side hydraulic pressure and associate low-side hydraulic pressure for several configurations of a vibratory seismic source signal generator.

FIG. 6 is a load cell pressure plot 600 comparing load cell operational pressures of various seismic vibratory source configurations. In each case, the supply pressure goal is 3000 psi and the return pressure goal is 250 psi. Ideal response curves would show a flat supply pressure response at 3000 psi and a flat return pressure response at 250 psi for the time window plotted. The plot 600 shows a hydraulic supply pressure response 602 using a conventional configuration, along with a corresponding hydraulic return pressure response 604 from the same conventional seismic vibratory source configuration. The plot 600 further includes hydraulic supply pressure response 606 using one non-limiting embodiment of the present disclosure, along with a corresponding hydraulic return pressure response 608 from the same example. Response curves 606/608 are generated using an example signal generator configuration having a primary truck-mounted accumulator and a secondary accumulator mounted directly on the vibratory source mass. The plot 600 further includes hydraulic supply pressure response 610 using another non-limiting embodiment of the present disclosure, along with a corresponding hydraulic return pressure response 612 from the same example. The third curve set 610, 612 is generated using an example signal generator configuration having a primary accumulator and a secondary accumulator, which is smaller than the primary accumulator similar to the non-limiting example described above and shown in FIG. 5.

It is evident from the curves that the several seismic vibratory signal generators herein in the various non-limiting examples of the disclosure provide reduced distortion on both the supply side hydraulic loop and on the return side hydraulic loop.

Figure 7:
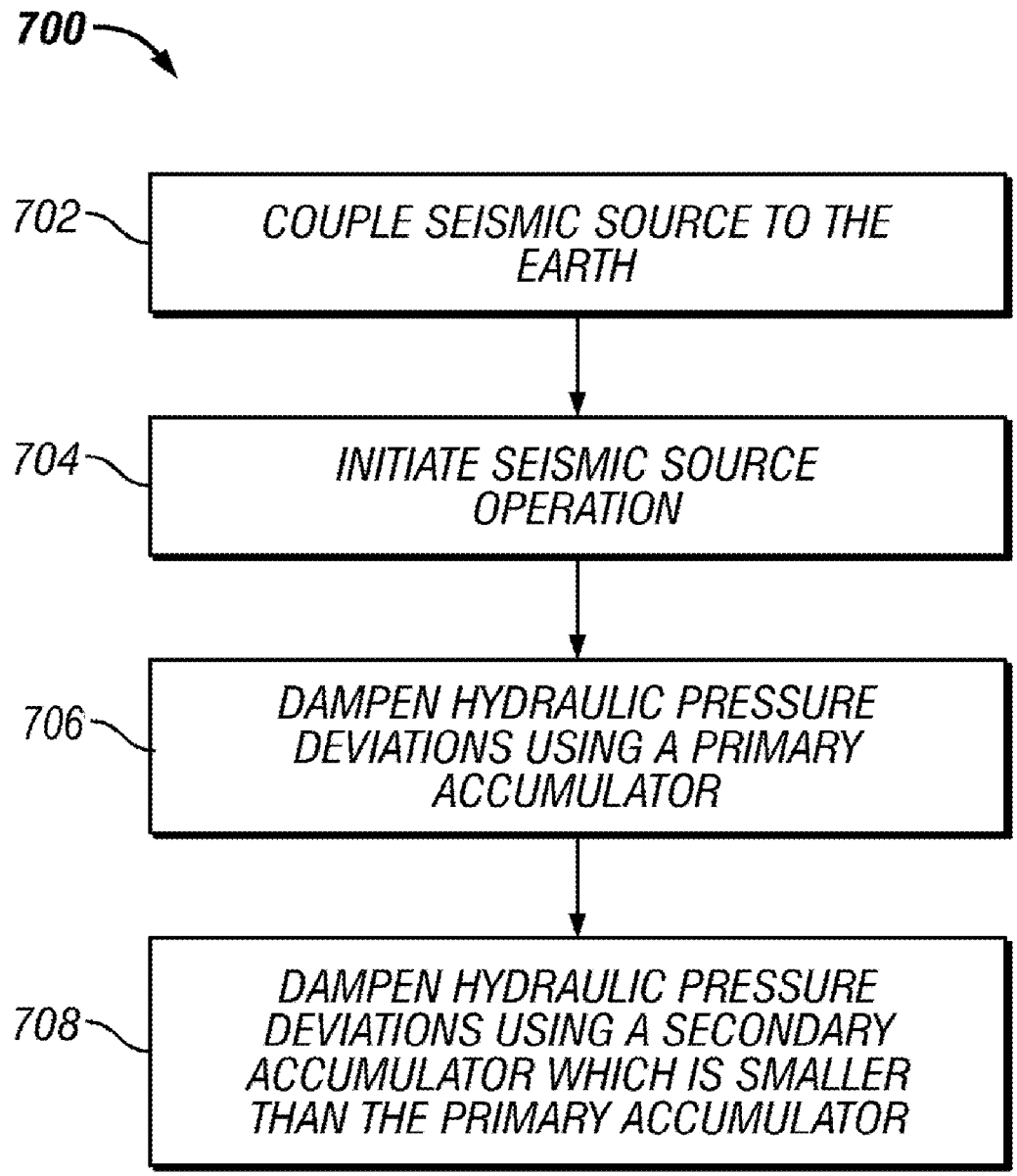
FIG. 7 is a non-limiting example of a method according to the disclosure.

FIG. 7 shows a non-limiting embodiment of a method 700 for generating a signal using a seismic vibrator. In one embodiment, the method includes coupling a seismic source to the earth 702 and initiating seismic source operation 704. In one embodiment, the method 700 includes dampening hydraulic pressure deviations using a primary accumulator 706 and dampening hydraulic pressure deviations using a second accumulator, which is smaller than the primary accumulator 708.

In one non-limiting example, the method 700 may include moving a mass using hydraulic fluid and controlling flow of the hydraulic fluid using a servo valve coupled to the mass. Pressure deviations in the hydraulic fluid are dampened using the primary or first accumulator, which is in hydraulic communication with the hydraulic fluid. Pressure deviations in the hydraulic fluid may be further dampened using the second accumulator in hydraulic communication with the hydraulic fluid.

In one non-limiting embodiment, the first accumulator is positioned on a carrier vehicle and the second accumulator is positioned on a reaction mass. The vehicle-carried accumulator may have an internal volume of about five gallons (19 liters) to about ten gallons (38 liters) or less with the mass-carried accumulator having an internal volume of about one-half that of the vehicle carried accumulator. On one embodiment, a vehicle-carried accumulator has a volume of 2.5 gallons (9.5 liters) or less. In another embodiment, the vehicle-carried accumulator has a volume of 5 gallons (19 liters) or less.

In one non-limiting embodiment, the second accumulator is smaller than the first accumulator. In one embodiment, the second accumulator has an internal volume of no more than about 10 cubic inches (0.16 liters).

In one non-limiting embodiment, the first accumulator and the second accumulator are each positioned on a reaction mass.

In one non-limiting embodiment, the second accumulator is coupled to a servo-valve. In aspects, the servo valve may be coupled to the reaction mass directly, or by using a manifold or spacer.

In one non-limiting embodiment, a first accumulator is positioned on a carrier vehicle, a second accumulator is positioned on a reaction mass and a third accumulator is positioned on the reaction mass. The third accumulator may be coupled to the servo valve. The second accumulator may be smaller than the first accumulator and the third accumulator may be smaller than each of the first accumulator and the second accumulator. In one non-limiting embodiment, the second accumulator is the same size as the accumulator positioned on the carrier vehicle and the third accumulator is smaller than the second accumulator.

The present disclosure is to be taken as illustrative rather than as limiting the scope or nature of the claims below. Numerous modifications and variations will become apparent to those skilled in the art after studying the disclosure, including use of equivalent functional and/or structural substitutes for elements described herein, use of equivalent functional couplings for couplings described herein, and/or use of equivalent functional actions for actions described herein. Such insubstantial variations are to be considered within the scope of the claims below.

Given the above disclosure of general concepts and specific embodiments, the scope of protection is defined by the claims appended hereto. The issued claims are not to be taken as limiting Applicant's right to claim disclosed, but not yet literally claimed subject matter by way of one or more further applications including those filed pursuant to the laws of the United States and/or international treaty.

What is claimed is:

1. A seismic vibrator, comprising:
  a mass movable by hydraulic fluid;
  a valve carried by the mass and connected to first and second lines of hydraulic fluid, the valve controlling communication of the hydraulic fluid of the first and second lines to move the mass; and
  first accumulators carried by the mass and each in hydraulic communication with the hydraulic fluid of the first line, the first accumulators having first internal volumes and damping first pressure deviations in the hydraulic fluid of the first line, the first internal volumes being different from one another, the first pressure deviations being different from one another.

2. The vibrator of claim 1, wherein the mass comprises a hydraulic piston in hydraulic communication with the hydraulic fluid controlled by the valve.

3. The vibrator of claim 1, wherein the first internal volume of one of the first accumulators is one-half or less of the first internal volume of the other first accumulator.

4. The vibrator of claim 1, wherein one of the first accumulators is coupled directly to the mass, and wherein another one of the first accumulator is coupled directly to the valve.

5. The vibrator of claim 1, wherein one of the first accumulators is coupled directly to the mass, and wherein another one of the first accumulators is disposed on a manifold coupling the valve to the mass.

6. The vibrator of claim 1, wherein one of the first pressure deviations dampened by one of the first accumulators has a higher frequency than another one of the first pressure deviations dampened by another one of the first accumulators.

7. The vibrator of claim 1, further comprising a second accumulator disposed apart from the mass and in fluid communication with the valve.

8. The vibrator of claim 1, wherein one of the first and second lines is a supply side hydraulic flow line, and wherein the other of the first and second lines is a return side hydraulic flow line.

9. The vibrator of claim 1, further comprising:
second accumulators carried by the mass and each in hydraulic communication with the hydraulic fluid of the second line, the second accumulators having second internal volumes and damping second pressure deviations in the hydraulic fluid of the second line, the second internal volumes being different from one another, the second pressure deviations being different from one another.

10. The vibrator of claim 9, wherein the second internal volumes of the second accumulators match the first internal volumes of the first accumulators.

11. The vibrator of claim 9, wherein the second pressure deviations dampened by the second accumulators match the first pressure deviations dampened by the first accumulators.

12. The vibrator of claim 9, wherein the second internal volume of one of the second accumulators is one-half or less of the second internal volume of another one of the second accumulators.

13. The vibrator of claim 12, wherein one of the first accumulators and one of the second accumulators each include an internal volume of about two and one half gallons to about five gallons, and wherein another one of the first accumulators and another one of the second accumulators each include an internal volume of about ten cubic inches.

14. The vibrator of claim 9, wherein one of the second accumulators is coupled directly to the mass, and wherein another one of the second accumulators is coupled directly to the valve.

15. The vibrator of claim 9, wherein one of the second accumulators is coupled directly to the mass, and wherein another one of the second accumulators is disposed on a manifold coupling the valve to the mass.

16. The vibrator of claim 9, wherein one of the second pressure deviations dampened by one of the second accumulators has a higher frequency than another one of the second pressure deviations dampened by another one of the second accumulators.

17. A seismic vibration method, comprising:
moving a movable mass of a seismic vibrator by controlling communication of hydraulic fluid to the movable mass with a valve, the valve coupled to first and second lines of hydraulic fluid and carried by the movable mass;
carrying first accumulators on the movable mass;
hydraulically communicating the first accumulators with the hydraulic fluid of the first line, the first accumulators having first internal volumes different from one another; and
damping first pressure deviations in the hydraulic fluid of the first line using the first accumulators, the first pressure deviations being different from one another.

18. The method of claim 17, wherein operating the movable mass comprises communicating the hydraulic fluid with the valve between a hydraulic piston and the first and second lines.

19. The method of claim 17, wherein the first internal volume of one of the first accumulators is one-half or less of the first internal volume of another one of the first accumulators.

20. The method of claim 17, wherein one of the first accumulators is coupled directly to the mass, and wherein another one of the first accumulators is coupled directly to the valve.

21. The method of claim 17, wherein one of the first accumulators is coupled directly to the mass, and wherein another one of the first accumulators is disposed on a manifold coupling the valve to the mass.

22. The method of claim 17, wherein one of the first pressure deviations dampened by one of the first accumulators has a higher frequency than another one of the first pressure deviations dampened by another one of the first accumulators.

23. The method of claim 17, further comprising:
hydraulically communicating a second accumulator with the hydraulic fluid of one of the first and second lines, the second accumulator disposed apart from the movable mass; and
damping a second pressure deviation in the hydraulic fluid of the one line using the second accumulator.

24. The method of claim 17, wherein one of the first and second lines is a supply side hydraulic flow line, and wherein the other of the first and second lines is a return side hydraulic flow line.

25. The method of claim 17, further comprising:
carrying second accumulators on the movable mass;
hydraulically communicating the second accumulators with the hydraulic fluid of the second line, the second accumulators having second internal volumes different from one another; and
damping second pressure deviations in the hydraulic fluid of the second line using the second accumulators, the second pressure deviations being different from one another.

26. The method of claim 25, wherein the second internal volumes of the second accumulators match the first internal volumes of the first accumulators.

27. The method of claim 25, wherein the second pressure deviations dampened by the second accumulators match the first pressure deviations dampened by the first accumulators.

28. The method of claim 25, wherein the second internal volume of one of the second accumulators is one-half or less of the second internal volume of the other second accumulator.

29. The method of claim 25, wherein one of the first accumulators and one of the second accumulators each include an internal volume of about two and one half gallons to about five gallons, and wherein another one of the first accumulators and another one of the second accumulators each include an internal volume of about ten cubic inches.

30. The method of claim 25, wherein one of the second accumulators is coupled directly to the mass, and wherein another one of the second accumulators is coupled directly to the valve.

31. The method of claim 25, wherein one of the second accumulators is coupled directly to the mass, and wherein another one of the second accumulators is disposed on a manifold coupling the valve to the mass.

32. The method of claim 25, wherein one of the second pressure deviations dampened by one of the second accumulators has a higher frequency than another of the second pressure deviations dampened by another one of the second accumulators.

* * * * *